United States Patent
Park et al.

(10) Patent No.: US 8,437,791 B2
(45) Date of Patent: May 7, 2013

(54) METHOD AND SYSTEM FOR CONTROLLING TALK TIME FOR POC USER

(75) Inventors: Sung-Jin Park, Suwon-si (KR);
Joon-Goo Park, Yongin-si (KR);
Sang-Kyung Sung, Seoul (KR)

(73) Assignee: Samsung Electronics Co., Ltd (KR)

( * ) Notice: Subject to any disclaimer, the term of this patent is extended or adjusted under 35 U.S.C. 154(b) by 2218 days.

(21) Appl. No.: 11/299,466

(22) Filed: Dec. 12, 2005

(65) Prior Publication Data

US 2006/0154681 A1    Jul. 13, 2006

(30) Foreign Application Priority Data

Dec. 14, 2004  (KR) .................. 10-2004-0105904

(51) Int. Cl.
*H04B 7/00*  (2006.01)
(52) U.S. Cl.
USPC ........... 455/518; 455/519; 455/520; 455/90.2
(58) Field of Classification Search ............... 455/90.2, 455/412.1, 414.1, 518–520, 416; 370/352, 370/389, 338, 328
See application file for complete search history.

(56) References Cited

U.S. PATENT DOCUMENTS

| 6,952,592 B2 * | 10/2005 | Dorenbosch | 455/518 |
| 7,558,286 B2 * | 7/2009 | Khatter | 370/468 |
| 7,738,893 B2 * | 6/2010 | Lim | 455/518 |
| 7,761,108 B2 * | 7/2010 | Lim | 455/518 |
| 7,764,633 B2 * | 7/2010 | Marque-Pucheu | 370/279 |
| 2002/0086665 A1 * | 7/2002 | Maggenti et al. | 455/416 |
| 2005/0032539 A1 * | 2/2005 | Noel et al. | 455/518 |
| 2005/0075121 A1 * | 4/2005 | Hasegawa | 455/518 |
| 2005/0260988 A1 * | 11/2005 | Kauppinen | 455/435.3 |

* cited by examiner

*Primary Examiner* — Dominic E Rego
(74) *Attorney, Agent, or Firm* — The Farrell Law Firm, P.C.

(57) ABSTRACT

A method and system for controlling a talk time for a PoC user is provided, capable of freely extending and using the talk time according to whether there is a floor requester or a priority when a talker obtains a floor during PoC communication. The method includes determining whether a talk limit time of a PoC client that is transferring a talk burst is close at hand; when the talk time limit is close at hand, determining whether or not a floor requester who makes a request for a floor is in a floor list for storing the floor requester; and when the floor requester is not in the floor list, extending the talk time and transferring the talk burst.

12 Claims, 8 Drawing Sheets

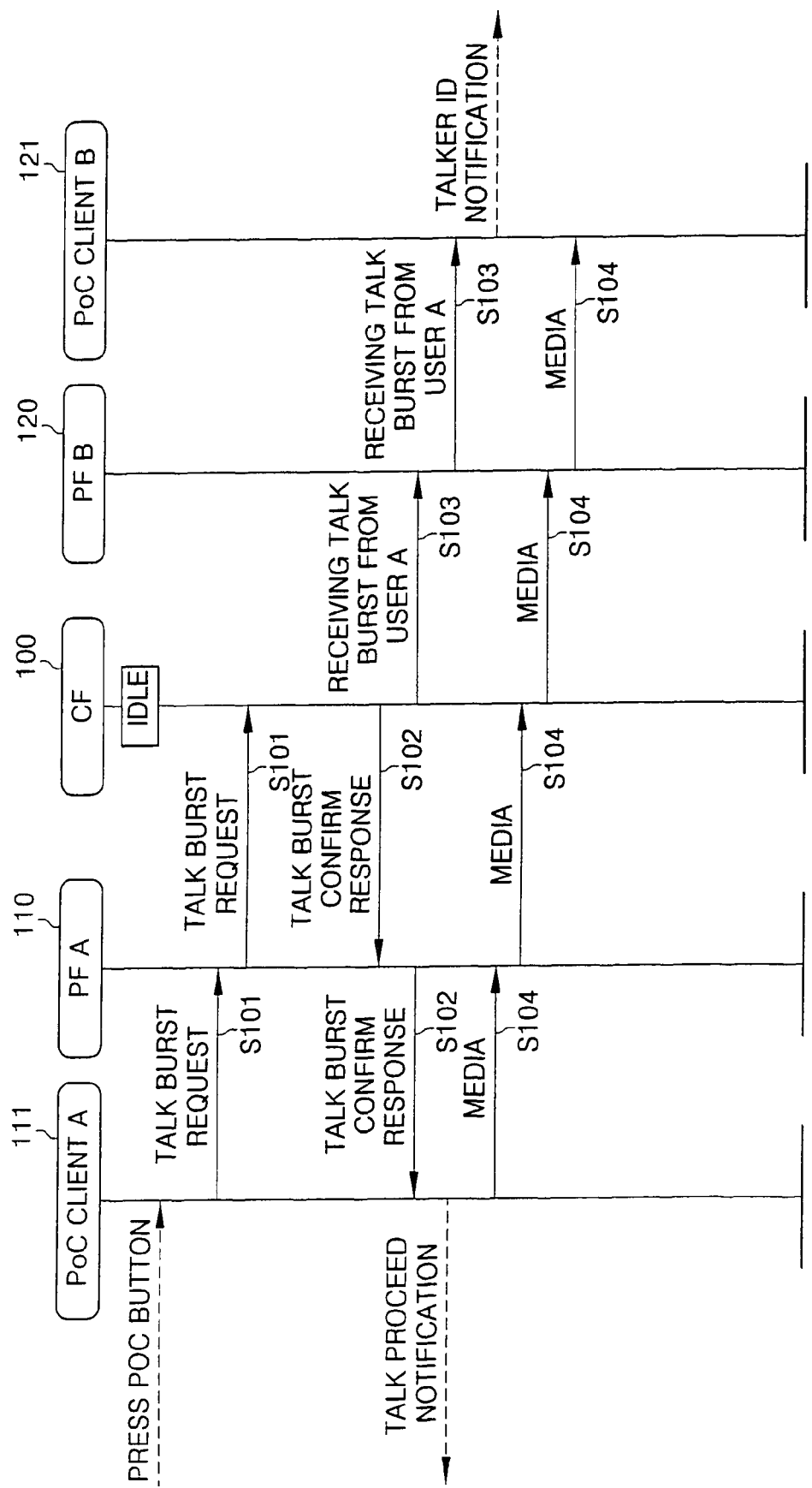

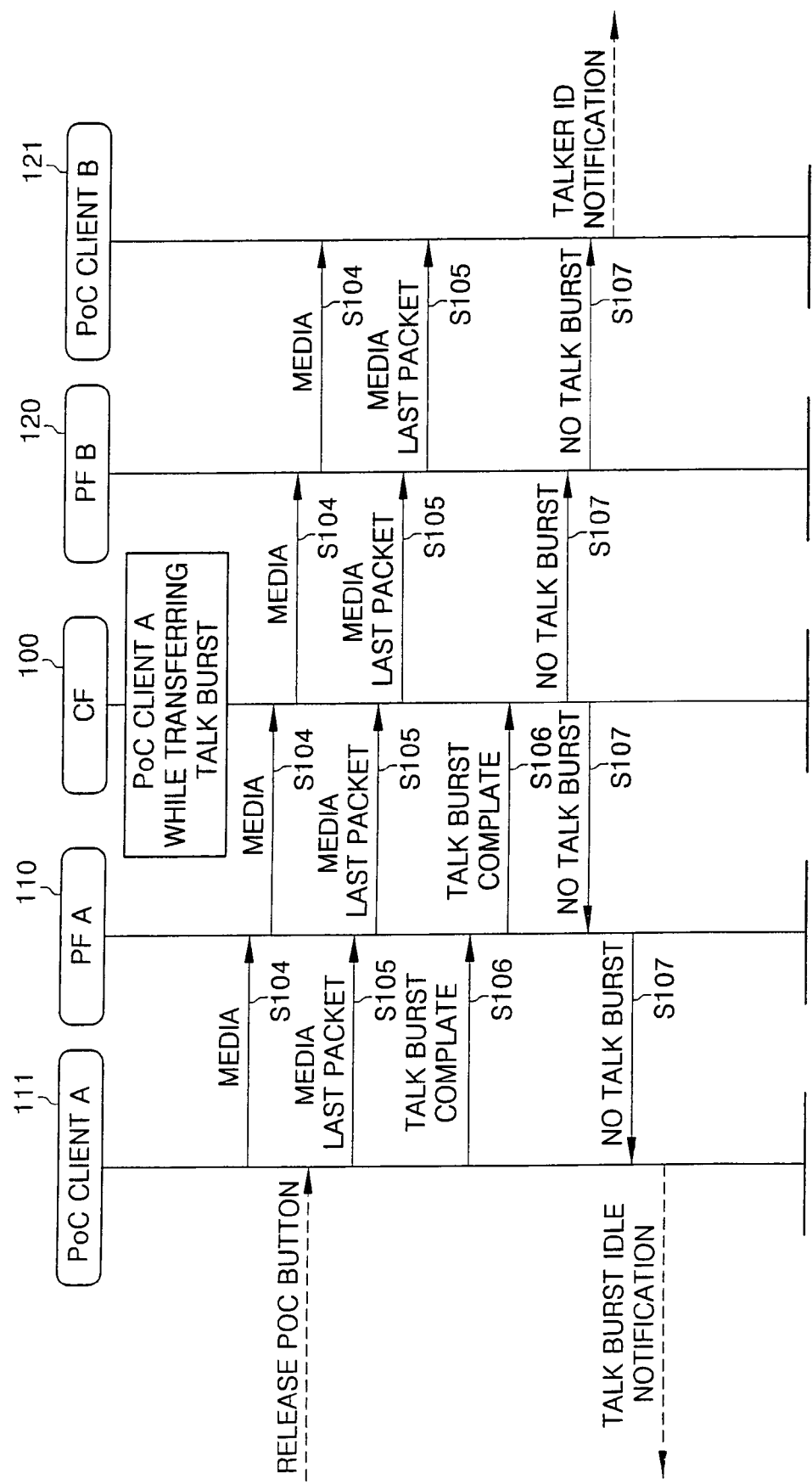

METHOD AND SYSTEM FOR CONTROLLING TALK TIME FOR POC USER

PRIORITY

This application makes reference to, incorporates the same herein, and claims all benefits accruing under 35 U.S.C. §119 from an application for METHOD AND SYSTEM FOR CONTROLLING TALK TIME FOR PoC USER filed in the Korean Intellectual Property Office on Dec. 14, 2004 and assigned Serial No. 10-2004-0105904.

BACKGROUND OF THE INVENTION

1. Field of the Invention

The present invention relates to a method and system for controlling a talk time for a PoC user, capable of freely making use of the talk time according to the priority of a talker when the talker obtains a floor without other requesters of the floor during PoC communication.

2. Description of the Related Art

Due to significant developments in mobile communication technology and extension of mobile communication networks, various extra services and applications which use a cellular phone are being provided. At the same time, demand among cellular phone users for various extra services, such as a location service, a multimedia service, and a push-to-talk (PTT) service, is increasing. Among these extra services, the PTT service supports various supplementary functions such as an instant messenger function and a status display function, as well as a group call and a voice call which are also provided by an existing radio or a trunk radio system (TRS).

Currently, standardization of a push-to-talk-over-cellular (PoC) service which employs the PTT function in a mobile communication network is actively being developed. One unique feature of the PoC service is that a user can participate in a plurality of PoC sessions and can move among the PoC sessions to use a call service. A requirement that the user can move among the plurality of PoC sessions to use the call service is specified in the Open Mobile Alliance (OMA) which is a forum for specifying mobile communications services.

FIG. 1 is a schematic diagram of a conventional PoC service system. Referring to FIG. 1, a PoC client 10, which is a service requester installed in a mobile station, is connected to a Session Initiation Protocol/Internet Protocol (SIP/IP) core network 30 which supports SIP and IP multimedia functions via an access network 20.

The PoC client 10 resides in a PoC user terminal to provide access to the PoC service. The PoC client 10 mainly serves to initiate a PoC session, participate in a PoC session that is currently proceeding, and terminate a PoC session. In addition, the PoC client 10 acts to make and transfer a talk burst, support an instant personal alert, and perform authentication when accessing the PoC service. Hereinafter, unless otherwise stated, the PoC client 10 is assumed to be the same as a PTT service subscriber.

The SIP/IP core network 30 is connected to a PoC server 60, a group list management system (GLMS) 50, and a presence server 70 in order to support the PoC service.

The PoC server 60 has a controlling PoC function for maintaining and managing a PoC session, or a participating PoC function for participating in a PoC session for a one-to-one PoC call or a one-to-many PoC call (or group PoC call).

Functional blocks of the PoC server 60 will be explained below with reference to FIG. 2.

A function of the PoC server is classified into a controlling PoC function (CF) for maintaining and managing a PoC session in general and a participating PoC function (PF) for maintaining each PoC session, which will be explained below.

TABLE 1

Controlling PoC Function (CF)

---

Provides centralized PoC session handling
Provides centralized Media distribution
Provides centralized Talk Burst Arbitration functionality including talker identification
Provides SIP session handling, such as SIP session origination, termination, etc.
Provides policy enforcement for participation in group sessions
Provides participant information
Collects and provides centralized media quality information
Provides centralized charging reports
May provide transcoding between different codecs
Supports Talk Burst Control Protocol Negotiation

---

As shown in Table 1, the CF serves to maintain and manage a PoC session in general. The PoC server receives requests for a floor (right to talk) from PoC clients, arranges an order in which to give the clients the floor, and gives the clients the floor in that order. The PoC server also distributes a talk burst from a specific PoC client to all PoC clients participating in a group PoC call, and provides information of the PoC clients participating in the group PoC call.

As shown in Table 2 below, the PF manages a PoC session between the CF and each PoC client. In particular, the PF acts to relay the floor between the PoC client and the CF when the PoC client requests the floor or when the CF gives the floor to the PoC client. In addition, the PF serves to relay media between the CF and the PoC client, provide transcoding between different codecs, and provide a filtering function for filtering one of two PoC sessions chosen by a user when there is simultaneous talking in two simultaneous PoC sessions.

TABLE 2

Participating PoC Function (PF)

---

Provides PoC session handling
May provide the Media relay function between PoC Client and Controlling PoC server
May provide user media adaptation procedures
May provide the Talk Burst control message relay function between PoC Client and Controlling PoC server
Provides SIP session handling, such as SIP session origination, termination, etc; on behalf of the represented PoC Client.
Provides policy enforcement for incoming PoC session (e.g. access control, incoming PoC session barring, availability status, etc.)
May collect and provide media quality information
Provides the participant charging reports
May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client

---

In the PoC service system described above, a PoC user can input information about a group and group members to the GLMS 50 through his/her PoC terminal, and can be aware of information about PoC users who he or she can call through an individual or group list transmitted from the GLMS 50. Alternatively, information about a group and group members in the GLMS 50 may be input, corrected and managed via a reliable communication network such as the Internet or Intranet which a PoC service provider can trust.

In order to make use of the PoC service, the PoC user registers his/her PoC address in the SIP/IP core network 30. The SIP/IP core network 30 stores PoC user information at the request of the PoC user. Thus, when another PoC user tries to request a group PoC call, the PoC user registers his/her information in the SIP/IP core network 30 in advance as described above, and requests the group PoC call to his/her SIP/IP core network by using group identification information transmitted from the GLMS 50. The SIP/IP core network 30 performs address determination and domain location determination using information of the call requesting PoC user and then transfers a PoC call request to a home PoC server with which the call requesting PoC user is registered. In regard to the PoC call request, the PoC server prepares for establishment of a PoC session, obtains each user's information from the GLMS 50, and then transfers a PoC call request signal to a corresponding SIP/IP core network 30. Here, in the case of a PoC call request to users within an Intradomain, the PoC server performs both the CF and PF. The PoC server, which manages a call-requested PoC user, requests a PoC call to the PoC user after the SIP/IP core network 30 performs the location determination procedure, by using information of the PoC user that is transmitted to the PoC server.

Referring to FIG. 3, PoC clients 111, 121, 131 and 141 provide access to a CF 100 through PFs 110, 120, 130 and 140 respectively, thereby establishing a PoC session. Here, when a floor is given to a requester qualified as a talker from the CF 100, media based on a talk of the corresponding PoC client is transmitted to each PoC client.

FIG. 4A is a flowchart showing a conventional procedure where a PoC user obtains a floor. Referring to FIG. 4A, in order to obtain a floor, a PoC client A 111 presses a PoC talk button installed to its own PoC terminal when no PoC client is talking within a PoC session where the PoC client A 111 is connected to a PoC client B 121.

Therefore, the PoC client A 111 transmits a message making a request for the floor to a PF A 110 acting as Participating PoC Function (S101), and thus the PF A 110 receiving the Floor Request message transmits the Floor Request message to a CF 100, a PoC server, acting as Controlling PoC Function of this PoC session (S101).

After receiving the floor request message, the CF 100 transmits a message, notifying that the floor is granted, to the PoC client A 111 (S102) as well as a message, notifying that the floor has been granted to the PoC client A 111, to the PoC client B 121. Since the latter message includes an identifier (ID) of the PoC client A 111 as a talker, the PoC client B 121 knows who the talker is.

Thereafter, a media session is initiated, and a talk burst is transmitted from the PoC client A 111 to the PoC client B 121 (S104).

The foregoing description is directed to the procedure of making a request for the floor when the PoC session is established. When the PoC session is not established, the PoC client A 111 makes a request to the PoC client B 121 to set up the PoC session, and the PoC server acting as the Controlling PoC Function between the two clients transmits a message relating to opening of the PoC session to the PoC client B 121. Then, the PoC client B 121 transmits a compliance response of the request to the CF 100 of the PoC server acting as the Controlling PoC Function, and the CF 100 transmits the Floor Grant message to the PoC client A 111. In this manner, the PoC client A 111 obtaining the floor transfers a talk (a data file converted into a voice signal) through the opened media session when initiating a talk with its PoC talk button pressed.

FIG. 4B is a flowchart showing a conventional procedure where a PoC user terminates a talk.

In FIG. 4B, during transferring a talk burst, the PoC client A 111 releases a PoC talk button after terminating a talk, and then the PoC client A 111 transfers a packet where the last talk of the talker is converted into a voice signal (S105) as well as a Talk Burst Complete message notifying that the talk is terminated to a CF 100 (S106). The CF 100 receiving the Talk Burst Complete message transmits a No Talk Burst message notifying that there is no talker within the session to the PoC client A 111 and PoC client B 121 (S107). Now, the session enters an idle state again.

The PoC user getting the messages in the foregoing way observes a maximum talk time period that is set up by a session establisher or a service provider. The PoC user may or not receive an indication notifying that termination of the talk is coming before the maximum talk time period has expired on the basis of a PoC service. If the talker continues to talk in spite of the expiration of the maximum talk time period, the CF does not transmit the talk burst data received from the PoC client A 111 to the PoC client B 121, which automatically results in depriving the PoC client A 111 of the floor.

In the conventional procedure, only when obtaining the floor in the PoC communication, the talker can talk for a predetermined maximum talk time period according to the setup of the provider or the PoC terminal. The standard formulated by the OMA defines the maximum talk time period so that it can be determined by the service provider or the first PoC user who establishes the session. This is because the PoC service is provided in a half-duplex mode. Specifically, if any participant of the PoC session continues to talk, the other participants cannot talk. Thus, the standard is directed to arbitrate this situation for the PoC system.

In other words, when the PoC user fails to terminate the talk for the maximum talk time period, the PoC user can make a request to the PoC server, the CF, acting as the Controlling PoC Function for the floor again after the maximum talk time period has lapsed, receive the Floor Grant message, and have the talk again, as discussed above. The PoC user has to wait for a time which it takes to obtain the floor again in the middle of the talk. Thereby, the PoC user can continue to talk, and the participants of the same session can listen to the talker (the PoC user), after they must also wait for the time which the talker requires to obtain the floor. This is also true of any talker having a priority.

However, if the floor is used in the above-mentioned way, an available time for the floor comes to an end in the middle of the talk when a person intends to continue to talk in excess of the maximum talk time period. As such, the person must stand the inconvenience that he/she performs the procedure of obtaining the floor again, and thus has the talk after obtaining the floor.

SUMMARY OF THE INVENTION

It is an objective of the present invention to provide a method and system for controlling a talk time for a PoC user, capable of continuing to talk when no user makes a request for a floor or when a current talker has a higher priority in obtaining the floor.

An aspect of the present invention provides a method for controlling a talk time for a PoC user. The method includes determining whether a talk limit time of a PoC client that is transferring a talk burst is close at hand; if the talk limit time is close at hand, determining whether or not a floor requester who makes a request for a floor is on a floor list for storing the floor requester; and if the floor requester is not on the floor list, extending the talk time and transferring the talk burst.

Another aspect of the present invention provides a system for controlling a talk time for a PoC user. The system includes at least one PoC client for establishing a same session; and a PoC server for managing the talk time of the PoC client, transmitting an alert message to the PoC client so as not to exceed a talk limit time, and extending the talk time for the PoC client that is currently talking when a floor requester who makes a request for a floor is not on a floor list for storing the floor requester.

A method for managing a floor in a PoC system will be described prior to the description of construction and operation of the present invention.

The PoC system employs a half-duplex mode where, when two or more PoC users participate in a PoC session and when one of the PoC users is a talker, the other PoC users who participate in the PoC session are listeners. In the PoC system, when the other participants except the talker make a request for a floor, a CF determines an order of granting the floor and stores it in a floor list.

In the PoC system, the order of indicating who obtains the floor with priority is set up in addition to management of the floor. The order is divided into four levels as follows: preemptive priority, high priority, normal priority and listen-only. In the case of the preemptive priority, even during talking, one PoC user is deprived of the floor as soon as another PoC user having preemptive priority makes a request for the floor, and then the floor is granted to the PoC user having preemptive priority. Accordingly, the PoC user having preemptive priority can become the talker whenever he/she wants to talk. The PoC user having high priority cannot become the talker by depriving the currently talking PoC user of the floor, but allows the request for the floor to be placed on the floor list even when making a request for the floor with late priority.

For example, when all the PoC users making a request for the floor have normal priority, and when the PoC user making a request for the floor has high priority, the PoC user having high priority can be given the next floor. In the case of normal priority, the PoC user is given the floor next to that for which the PoC user having high priority made a request before that time. In the case of the listen-only, the PoC user can not make a request for the floor but can only listen to the other PoC user.

The present invention is directed to a method and system for extending a maximum talk time, when there is no PoC user making a request for the floor or when a currently talking PoC user has a priority higher than that of the PoC user making a request for the floor in a floor list.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, wherein:

FIG. 4A is a flowchart showing a conventional procedure where a PoC user obtains a floor;

FIG. 4B is a flowchart showing a conventional procedure where a PoC user terminates a talk;

DETAILED DESCRIPTION OF EXEMPLARY EMBODIMENTS

The present invention will now be described more fully hereinafter with reference to the accompanying drawings, in which exemplary embodiments of the invention are shown. This invention may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art. Like numbers refer to like elements throughout the specification.

Figure 1:
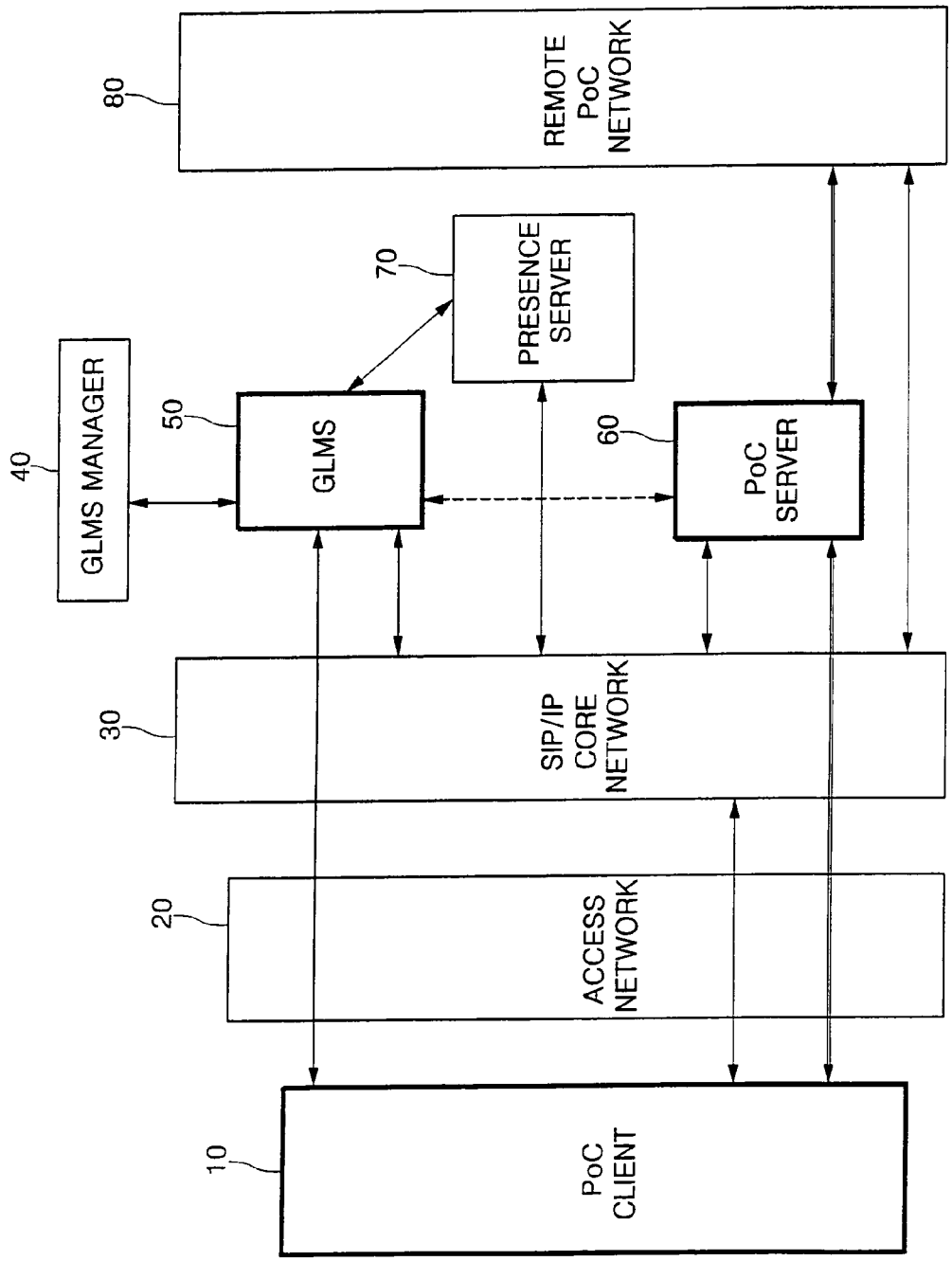
FIG. 1 is a schematic diagram of a conventional PoC service system.
Figure 2:
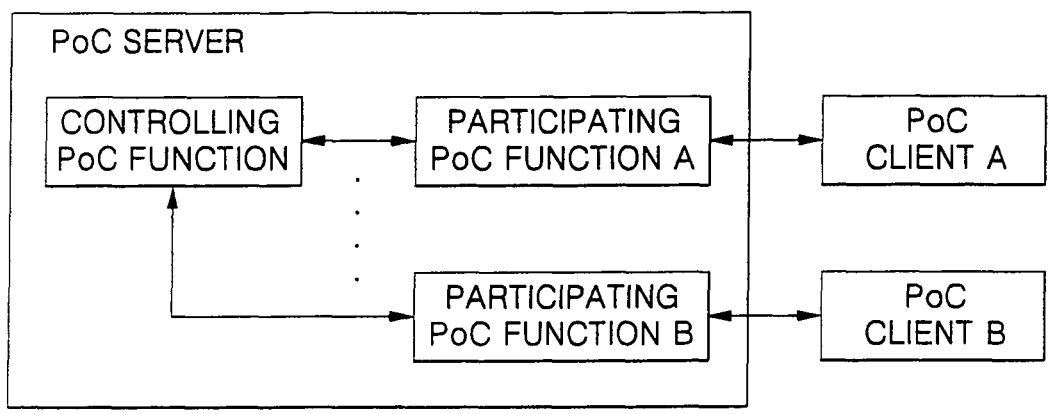
FIG. 2 schematically shows the structure of a conventional PoC server.
Figure 3:
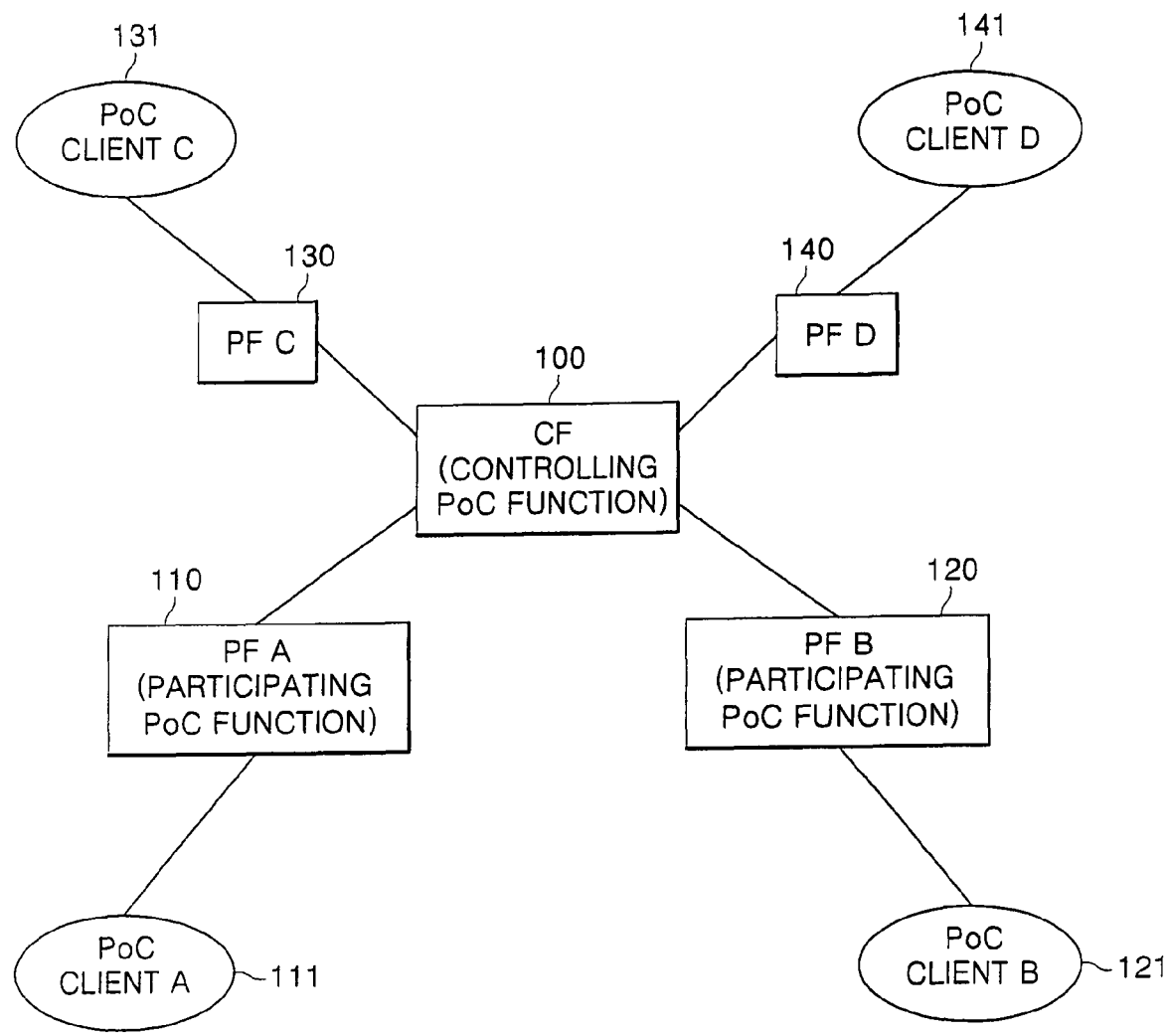
FIG. 3 is a diagram schematically illustrating CF and PF blocks of a PoC server.
Figure 5:
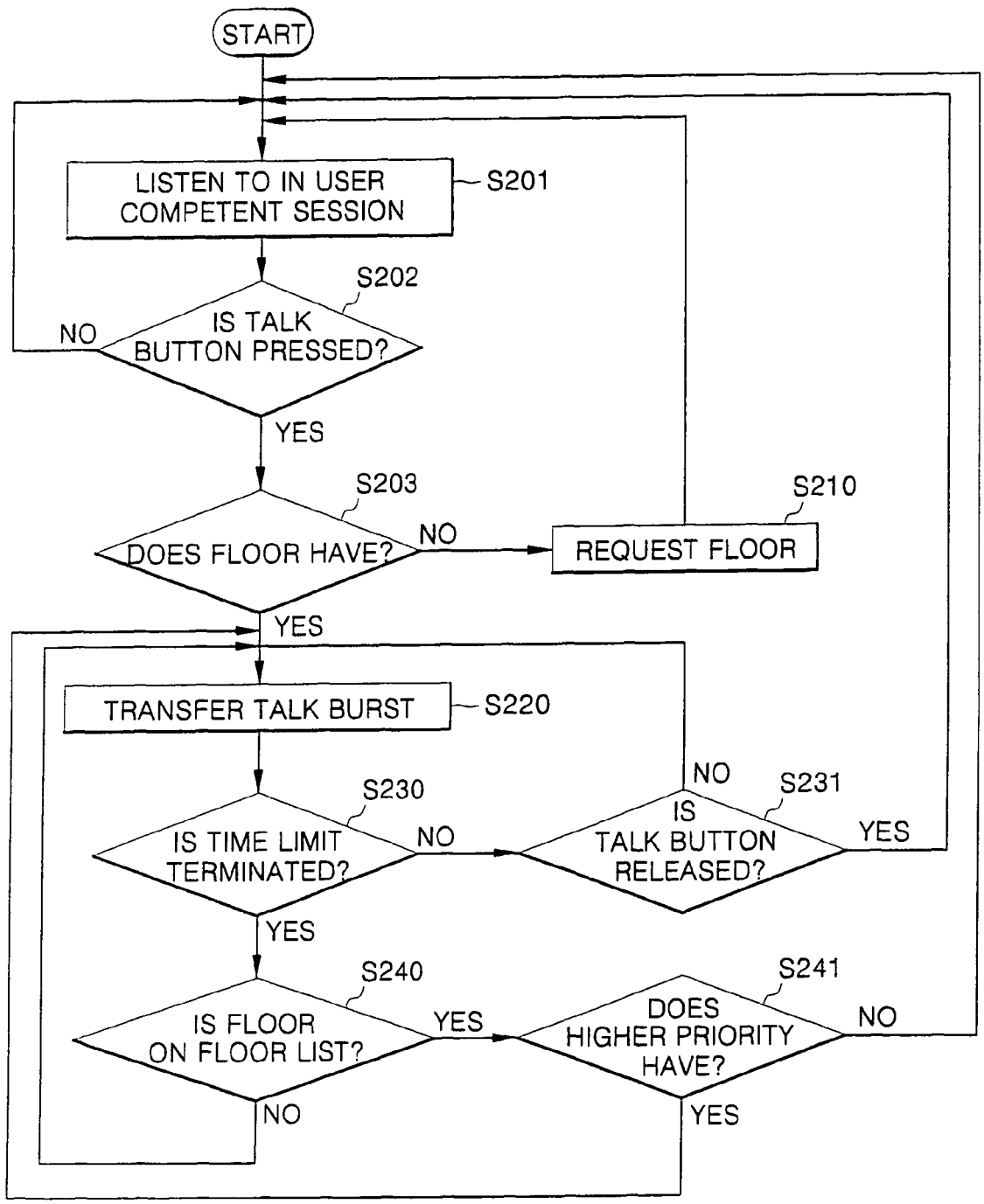
FIG. 5 is a flowchart showing a method for controlling a talk time for a PoC user according to an exemplary embodiment of the present invention.

FIG. 5 is a flowchart showing a method for controlling a talk time for a PoC user according to an exemplary embodiment of the present invention.

Referring to FIG. 5, when a PoC session is established, a PoC user has to listen to another participant in the PoC session until he/she requests a floor (S201). Since a PoC system employs a half-duplex mode, no other participant has the floor when any participant is talking. In this manner, when desiring to talk during listening to the other participant, a participant presses a PoC talk button (S202).

In step S202, if it is determined that the button is pressed, the participant makes a request for the floor to a PoC server X acting as Controlling PoC Function. In this case, in the PoC system where a separate floor list of controlling the floor is not provided, the request for the floor is neglected if the other participant is talking at that time. However, in the PoC system where such a separate floor list of controlling the floor is provided as in the present invention, the floor list is stored in the PoC server X, and the floor is given to the participant when the order of the talking participant is completed.

It is determined whether the requested may have the floor (S203). If it is determined that the PoC talk button is pressed without the floor, the floor is requested (S210). If it is determined that the PoC talk button is pressed with the floor (S203), the participant is good to talk directly because his/her terminal is ready to convert his/her voice into a voice signal (S220).

Meanwhile, when setting up the session, a service provider or a session establisher may set up a maximum talk time period and a time to send an alert message notifying that the maximum talk time period has nearly expired.

In this state, the PoC client A 111 transmits the voice signal to the CF 100. The CF 100 receives the voice signal and then transmits the voice signal to the other participants of the session. In the meantime, the CF 100 preferentially checks whether the user releases the PoC talk button to complete talking (S231).

In step S231, if the PoC talk button is not released, the user can continue to talk. If not so, the process returns to step 201, and the user listens to the other participant.

Then, if it is time to send the alert message notifying that the maximum talk time period has nearly expired, namely if a time when the maximum talk time period has expired is close at hand (S230), the CF 100 checks whether a floor requester who requests the floor is in the floor list, prior to sending the alert message to the PoC client A 111 (S240).

In step S240, if it is determined that no floor requester is in the floor list, the maximum talk time period set up for the CF 100 is set to a default value, and a timer is operated again, and the PoC user who is currently talking can continue to transfer the talk burst. In other words, the floor time is extended.

However, if the floor requester is in the floor list, a priority of the floor requester is compared (S241).

If a current talker has a preemptive priority or a priority higher than that of the floor requester in the floor list, the maximum talk time period is extended, and the talk burst can be continuously transferred.

Thereafter, if the talker is still talking immediately before the alert message notifying that the maximum talk time period has nearly expired is sent, steps S230, S240 and S241 are repeated.

Figure 6:
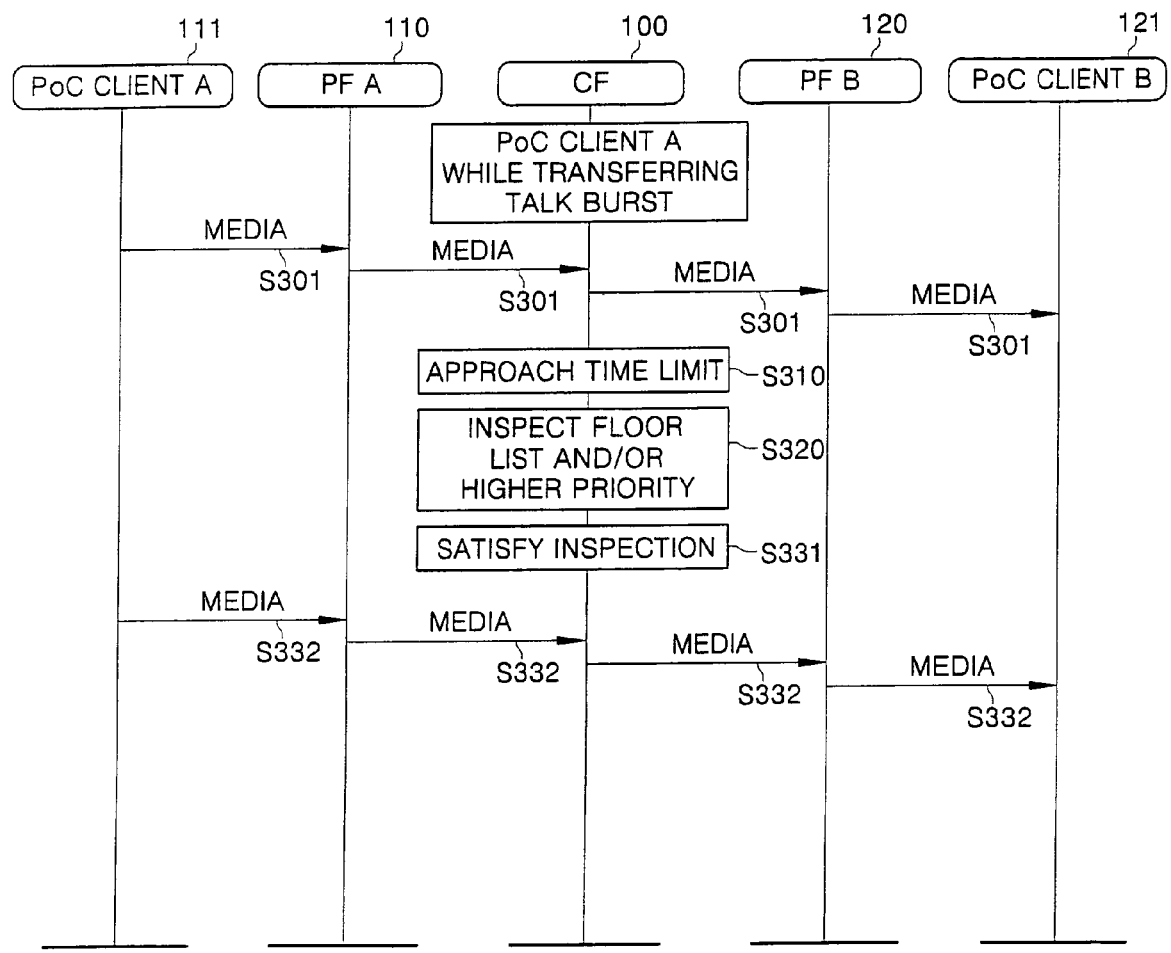
FIG. 6 is a flowchart of a case where a floor requester is not in a floor list or where a current talker has a priority higher than that of the floor requester.

FIG. 6 is a flowchart of a case where a floor requester is not in a floor list or where a current talker has a priority higher than that of the floor requester.

Referring to FIG. 6, in the situation where the PoC client A 111 is talking, and the talking is processed in the PoC terminal and system and then transmitted to the PoC client B 121, namely during transferring a talk burst (S301), the CF 100 determines when the maximum talk time period of a current talker has expired (S310).

In step S310, if it is determined that a time when the maximum talk time period has expired is close at hand, a floor list and/or a higher priority is inspected (S320). If it is determined that any one of the floor list and the higher priority is satisfied (S331), the CF extends the maximum talk time period to continue to transmit a voice of the PoC client A 111 to the PoC client B 121 (S332).

Figure 7:
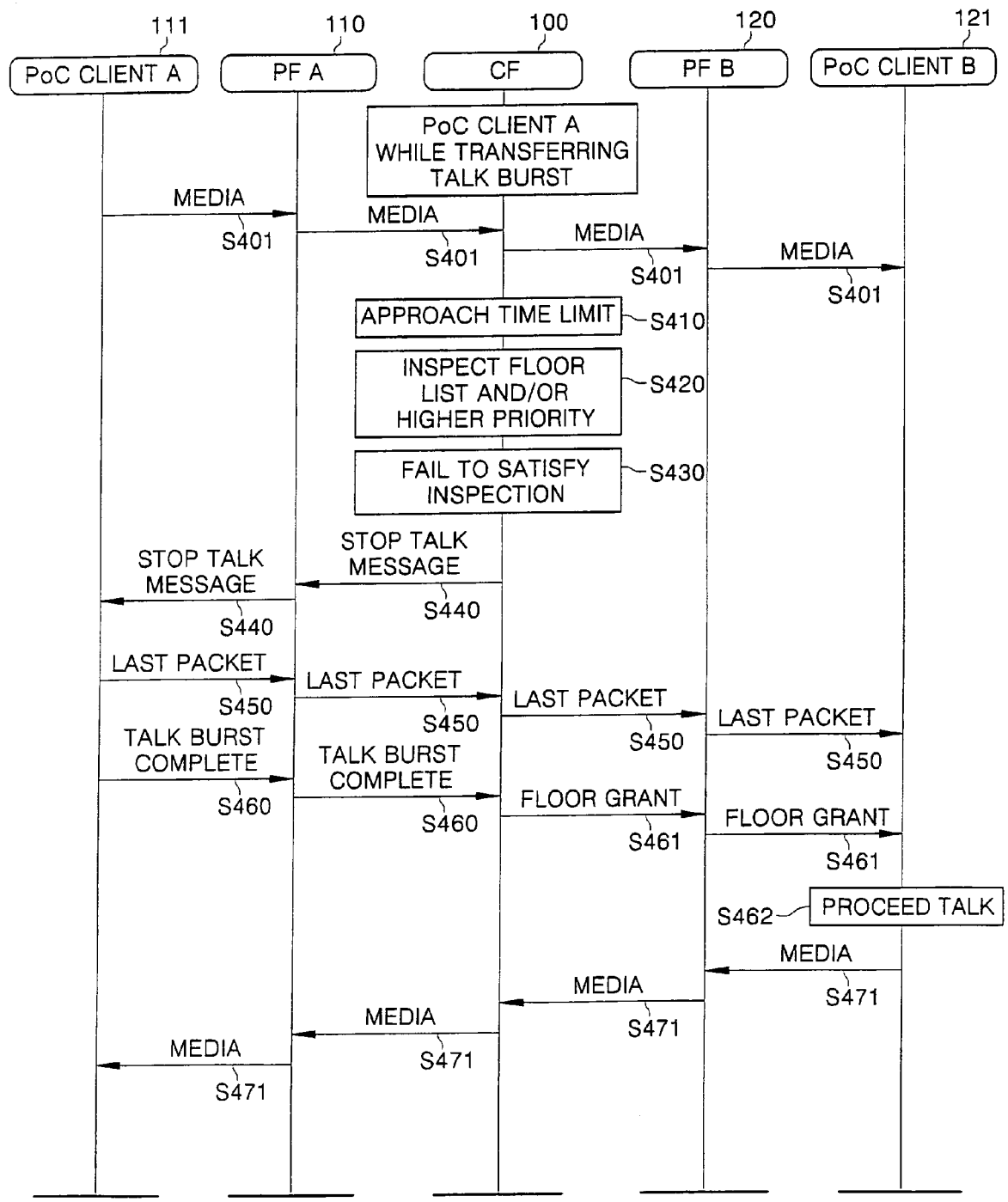
FIG. 7 is a flowchart of a case where a floor requester is in a floor list or where a current talker has a priority lower than that of the floor requester.

FIG. 7 is a flowchart of a case where a floor requester is in a floor list or where a current talker has a priority lower than that of the floor requester.

Referring to FIG. 7, in the situation where the PoC client A 111 is talking, and the talking is processed in the PoC terminal and system and then transmitted to the PoC client B 121, namely during transferring a talk burst (S401), the CF 100 determines when the maximum talk time period of a current talker has expired (S410).

In step S410, if it is determined that a time when the maximum talk time period has expired is close at hand, a floor list and/or a higher priority is inspected (S420). If it is determined that neither the floor list nor the higher priority is satisfied (S430), the CF 100 transmits an alert message of stopping the talk to the PoC client A 111 (S440).

The PoC client A 111 receiving the alert message releases the PoC button or stops talking automatically. Thereby, a last packet of a voice signal into which a last talk of the PoC user is converted is transmitted to the PoC client B 121 through the PoC system (S450).

At the same time, the PoC client A 111 transmits a Talk Burst Complete message notifying that the talk of the PoC user is completed to the CF 100 (S460). The CF 100 receiving the Talk Burst Complete message transmits a message granting a floor to the PoC user (in FIG. 7, the PoC client B 121) having the next floor (S461). The PoC client B 121 receiving the floor has a talk with its PoC talk button pressed from this point in time (S462). The talk is transmitted to the PoC client A 111 and other clients of the session through media opened to them (S471).

The present invention may be applied to both a system where the communication of the half-duplex type is opened using an IP multimedia Subsystem (IMS) that is being or has been standardized in 3GPP or 3GPP2, and a system where the communication according to a communication request is opened using the presence information of the user.

According to the present invention, when the PoC user is talking on the basis of the floor in the participating session, in the situation where the maximum talk time period has nearly expired even when his/her talking is not yet completed, and thus the floor is lost, when no floor requester is in the floor list or the PoC user has the higher priority in obtaining the floor, the PoC user can extend the maximum talk time period to continue the talk.

Further, the PoC user can avoid the procedure of making a request for the floor again due to the interruption of the talk, so that it is possible to prevent a phenomenon where the talk time is delayed as long as the time to perform the procedure in the middle. This is equally true of the talking PoC user as well as the other participants listening to the talker in the same session, so that the overall time can be shortened.

While the present invention has been described with reference to exemplary embodiments thereof, it will be understood by those skilled in the art that various changes in form and detail may be made therein without departing from the scope of the present invention as defined by the following claims.

What is claimed is:

1. A method for controlling a talk time for a Push to Talk Over Cellular (PoC) user, the method comprising the steps of:
   determining whether a talk time limit of a PoC client that is transferring a talk burst is close at hand;
   when the talk time limit is close at hand, determining whether a floor requester who makes a request for a floor is in a floor list for storing the floor requester;
   when the floor requester is not in the floor list, extending the floor and transferring the talk burst without sending a message notifying that the talk time limit has nearly elapsed;
   when the floor requester is in the floor list, determining whether the PoC client who is currently talking has a priority lower than that of the floor requester; and
   when the PoC client who is currently talking has a priority lower than that of the floor requester, sending the message notifying that the talk time limit has nearly elapsed to the PoC client and terminating a talk after transferring the talk burst up to the talk time limit.

2. The method according to claim 1, further comprising the steps of:
   when the floor requester is in the floor list, checking whether the PoC client who is currently talking has a priority higher than that of the floor requester; and
   when the PoC client who is currently talking has a priority higher than that of the floor requester, extending the talk time and transferring the talk burst.

3. The method according to claim 2, wherein the step of checking whether the PoC client who is currently talking has a priority higher than that of the floor requester further includes a step of, when it is determined that the priority of the PoC client who is currently talking is a preemptive priority, extending the floor regardless of the floor requester and transferring the talk burst.

4. The method according to of claim 3, wherein, when the talk time is extended, a preset maximum talk time period is set to a default value and a timer is operated again.

5. The method according to of claim 2, wherein, when the talk time is extended, a preset maximum talk time period is set to a default value and a timer is operated again.

6. The method according to of claim 1, wherein, when the talk time is extended, a preset maximum talk time period is set to a default value and a timer is operated again.

7. A system for controlling a talk time for a PoC user, the system comprising:
- at least one participating PoC server for relaying a talk burst and messages between at least one PoC client and a controlling PoC server; and
- the controlling PoC server configured to:
- determine whether a talk time limit of a PoC client that is transferring the talk burst is close at hand;
- when the talk time limit is close at hand, determine whether a floor requester who makes a request for a floor is in a floor list for storing the floor requester;
- when the floor requester is not in the floor list, extend the floor and transfer the talk burst without sending a message notifying that the time limit has nearly elapsed;
- when the floor requester is in the floor list, check whether the PoC client who is currently talking has a priority lower than that of the floor requester; and
- when the PoC client who is currently talking has a priority lower than that of the floor requester, send the message notifying that the time limit has nearly elapsed to the PoC client and terminate a talk after transferring the talk burst up to the talk time limit.

8. The system according to claim 7, wherein the PoC server checks whether the PoC client who is currently talking has a priority higher than that of the floor requester when the floor requester is the floor list, and extends the talk time of the PoC client who is currently talking when the PoC client who is currently talking has a priority higher than that of the floor requester.

9. The system according to claim 8, wherein the PoC server extends the talk time regardless of the floor requester when the priority of the PoC client who is currently talking is a preemptive priority.

10. The system according to claim 9, wherein the PoC server sets a preset maximum talk time period to a default value, and operates a timer again when the talk time is extended.

11. The system according to claim 8, wherein the PoC server sets a preset maximum talk time period to a default value, and operates a timer again when the talk time is extended.

12. The system according to claim 7, wherein the PoC server sets a preset maximum talk time period to a default value, and operates a timer again when the talk time is extended.

* * * * *